(12) United States Patent
Zhao et al.

(10) Patent No.: US 11,787,991 B1
(45) Date of Patent: Oct. 17, 2023

(54) DISINTEGRABLE RUBBER SEAL, METHOD OF MANUFACTURE, AND APPLICATION THEREOF

(71) Applicants: Lei Zhao, Houston, TX (US); Zhiyue Xu, Cypress, TX (US); Zhihui Zhang, Katy, TX (US); Guijun Deng, The Woodlands, TX (US)

(72) Inventors: Lei Zhao, Houston, TX (US); Zhiyue Xu, Cypress, TX (US); Zhihui Zhang, Katy, TX (US); Guijun Deng, The Woodlands, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 17/717,878

(22) Filed: Apr. 11, 2022

(51) Int. Cl.
*C09K 8/524* (2006.01)
*C09K 8/508* (2006.01)

(52) U.S. Cl.
CPC ............ *C09K 8/5083* (2013.01); *C09K 8/524* (2013.01)

(58) Field of Classification Search
CPC ............................... C09K 8/5083; C09K 8/524
See application file for complete search history.

(56) References Cited

U.S. PATENT DOCUMENTS

| | | | |
|---|---|---|---|
| 3,674,589 A | 7/1972 | Schaab et al. | |
| 7,743,835 B2 | 6/2010 | Willauer | |
| 8,689,875 B2 | 4/2014 | Dudley et al. | |
| 9,243,483 B2 | 1/2016 | Keller et al. | |
| 9,580,553 B2 | 2/2017 | Boydston et al. | |
| 9,790,763 B2 | 10/2017 | Fripp et al. | |
| 10,119,359 B2 | 11/2018 | Frazier | |
| 10,227,841 B2 | 3/2019 | Fripp et al. | |
| 10,450,840 B2 * | 10/2019 | Xu | E21B 47/00 |
| 10,619,084 B2 | 4/2020 | Okura et al. | |
| 10,662,274 B2 | 5/2020 | Kohl et al. | |
| 10,724,340 B2 | 7/2020 | Fripp et al. | |
| 2016/0237774 A1 | 8/2016 | Okura et al. | |
| 2016/0290091 A1 | 10/2016 | Takahashi et al. | |
| 2016/0376869 A1 | 12/2016 | Rochen et al. | |
| 2017/0284167 A1 * | 10/2017 | Takahashi | B32B 27/40 |
| 2017/0369708 A1 | 12/2017 | Kokel et al. | |
| 2018/0118925 A1 * | 5/2018 | Gozalo | C08K 3/06 |
| 2018/0128070 A1 | 5/2018 | Chang et al. | |
| 2020/0123873 A1 | 4/2020 | Sherman et al. | |

OTHER PUBLICATIONS

Li et al. "The Application of Fully Dissolvable Frac Plug Technique in Weiyuan Gasfield" https://www.onepetro.org/conference-paper/SPE-192422-MS; https://doi.org/10.2118/192422-MS.
Terves et al. "Terves Launches Oil and Gas Dissolvable Elastomer" https://dialog.proquest.com/professional/docview/2008754006?accountid=157282.

* cited by examiner

*Primary Examiner* — Kumar R Bhushan
(74) *Attorney, Agent, or Firm* — CANTOR COLBURN LLP

(57) ABSTRACT

A disintegrable rubber seal includes a rubber composite, which contains a rubber matrix including a crosslinked rubber; and an energetic filler configured to generate heat upon activation to disintegrate the rubber matrix. The energetic filler contains a metal and a metal oxide. A weight ratio of the energetic filler to the rubber matrix is about 6:1 to about 1:1.

18 Claims, 3 Drawing Sheets

DISINTEGRABLE RUBBER SEAL, METHOD OF MANUFACTURE, AND APPLICATION THEREOF

BACKGROUND

Rubber seals have been broadly used in downhole equipment and tools. Certain seals can function as a temporary barrier and after their service function is complete, they must be bypassed or the seal component has to be moved in order to establish a fluid pathway for use, including hydrocarbon production, $CO_2$ sequestration, etc. Disposal of seal components has conventionally been done by milling or drilling the seals out of the wellbore, which are generally time consuming and expensive operations Recently, degradable rubber seals have been proposed. Instead of milling or drilling operations, these seals can be removed alone by degrading in a downhole fluid. However, since degradation normally involves a hydrolysis reaction, the rubber used in the degradable seals needs to have a functional group such as an ester group or an amide group that is susceptible to hydrolysis. This requirement restricts the materials that can be used in the degradable seals. In addition, the degradation of the rubber seals relies on environmental factors such as the temperature and the type of fluids that contact the rubber seals, thus the degradation is not controllable as it is desired by the users. Further, the degradation process is typically slow, and it can take days to months for the rubber seals to degrade, which is not desirable since the sooner the seals are removed, the quicker the well can be put on production. Accordingly, there is a continuing need for rubbers seals that have minimal or no disintegration during the service of the seals so that they have the mechanical properties necessary to perform their intended function and then rapidly disintegrate in response to a customer command. It would be a further advantage if such seals can also disintegrate in a safe and controlled manner.

BRIEF DESCRIPTION

A disintegrable rubber seal comprises a rubber composite that comprises a rubber matrix comprising a crosslinked rubber; and an energetic filler configured to generate heat upon activation to disintegrate the rubber matrix, the energetic filler comprising a metal and a metal oxide; wherein a weight ratio of the energetic filler to the rubber matrix is about 6:1 to about 1:1.

A method of manufacturing the disintegrable seal as described above comprises: mixing the base elastomer, the crosslinking agent, the metal, and the metal oxide to provide a precursor composition; and molding the precursor composition thereby forming the disintegrable rubber seal.

A method of controllably removing a disintegrable rubber seal as described above comprises: disposing a sealing system in a downhole environment, the sealing system comprising a mandrel and the disintegrable rubber seal disposed about the mandrel; performing a downhole operation; activating the energetic filler by initiating a self-propagation reaction of the energetic filler to generate heat; and disintegrating the disintegrable seal with the heat generated by the self-propagation reaction.

BRIEF DESCRIPTION OF THE DRAWINGS

The following description should not be considered limiting in any way. With reference to the accompanying drawings, like elements are numbered alike:

FIG. 3A shows that the disintegrable rubber seal is disposed in a wellbore,
FIG. 3B shows that the disintegrable rubber seal is expanded;
and FIG. 3C shows that the disintegrable rubber seal is removed.

DETAILED DESCRIPTION

Figure 1A:
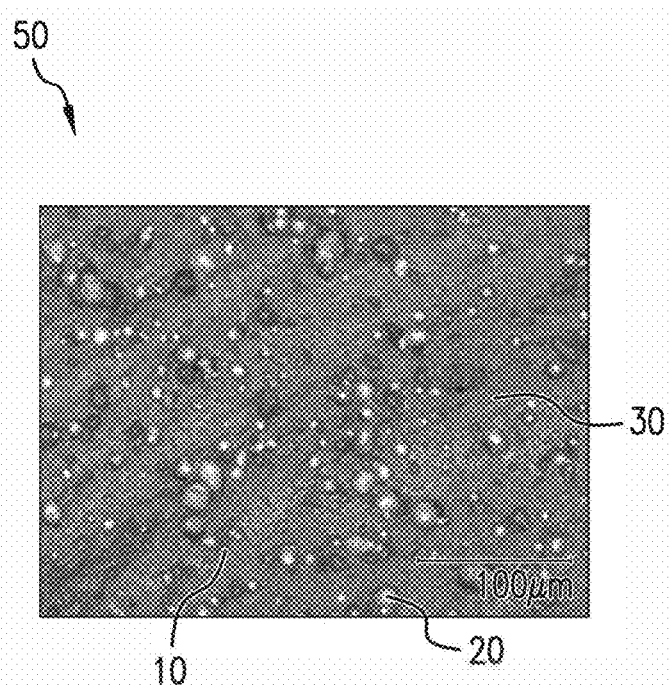
FIG. 1A is a microstructural image of a rubber composite.

A rubber seal that can disintegrate within minutes when no longer needed is described. The disintegrable seal comprises a rubber composite, which includes a rubber matrix and an energetic filler. The rubber matrix itself is not degradable or hydrolysable in downhole fluids such as water, a brine, or acid, and can have a degradation rate of less than about 0.05 milligram per square centimeter per hour ($mg/cm^2/hour$), less than about 0.01 $mg/cm^2/hour$, or less than 0.005 $mg/cm^2/hour$, determined in aqueous 3 wt. % KCl solution at 200° F. Thus the integrity of the rubber seal is maintained during its service, and possible premature degradation associated with certain conventional degradable seals can be avoided.

When no longer needed, upon activation, the energetic filler in the disintegrable rubber seal can undergo a self-sustained and self-propagated reaction that is not affected by downhole fluid or hydrostatic pressure. The self-sustained and self-propagated reaction generates heat and instantly disintegrate the rubber seal. The energetic filler can also function as a filler to enhance the mechanical properties of rubber matrix. The disintegrable seal can be used under various downhole conditions.

The rubber matrix comprises a crosslinked rubber, which provides the general material properties such as strength and ductility for the seal functions. The crosslinked rubber comprises a base elastomer crosslinked by a crosslinking agent, optionally in the presence of at least one of an accelerator or an activator. The base elastomer can include at least one of an ethylene-propylene-diene monomer rubber (EPDM); a butadiene rubber; a styrene-butadiene rubber (SBR); a natural rubber; an acrylonitrile butadiene rubber; a styrene-butadiene-acrylonitrile resin; a nitrile butadiene rubber (NBR); a hydrogenated nitrile butadiene rubber (HNBR); a carboxylated nitrile butadiene rubber (XNBR); a carboxylated hydrogenated nitrile butadiene rubber (XHNBR); an amidated nitrile butadiene rubber (ANBR); a synthetic polyisoprene rubber; an acrylate-butadiene rubber; a polychloroprene rubber; an acrylate-isoprene rubber; an ethylene-vinyl acetate rubber; a polypropylene oxide rubber; or a polypropylene sulfide rubber; fluorinated polymer rubbers (e.g. FKM), perfluorocarbon rubber (FFKM), tetrafluoro ethylene propylene rubbers (FEPM, such as AFLAS™ fluoroelastomers available from Asahi Glass Co. Ltd.).

The crosslinking agent can comprise sulfur (elemental sulfur) or sulfur-containing compounds (sulfur donors), bis-phenols, or peroxides. Elemental sulfur can be used in an amount of about 0.5 to about 3.5 parts by weight per 100 parts by weight of the base elastomer. Examples of sulfur donors include tetramethylthiuram disulfide (TMTD), N-oxydiethylene-N'-oxydiethylenethiocarbamylsulfonamide (OTOS), dipentamethylenethiuramtetrasulfide (DPTT), 2-morpholinodithiobenzothiazole (MBSS), dithiomorpholine (DTDM), caprolactam disulfide (CLD), or alkyl phenol disulfide. The sulfur donors can be used in an amount of about 0.5 to about 6 parts by weight per 100 parts by weight of the base elastomer.

Examples of the peroxide include di(2,4-dichlorobenzoyl) peroxide; benzoyl peroxide; 1,1-bis(t-butylperoxy)-3,3,5-trimethyl cyclohexane; t-butyl perbenzoate; dicumyl peroxide (Di-Cup); di(t-butylperoxy)diisopropylbenzene (Vul-Cup); 2,5-dimethyl-2,5-di (t-butylperoxy)hexane; di-t-butyl peroxide; or 2,5-dimethyl-2,5-di(t-butylperoxy) hexyne. The peroxide crosslinking agent can be used in amounts of about 0.1 to about 8 parts, or about 0.5 to 5 parts, or about 0.5 to 3 parts, by weight, per 100 parts by weight of the base elastomer. While the peroxide crosslinking agent leads to formation of desired crosslink formation, the competitive reactions can meantime cause undesired polymer scission or other degradation. The balance can be shifted toward desired crosslinking through the use of coagent compounds. The coagent compounds can include triallyl cyanurate (TAC), triallyl isocyanurate (TAIC), trimethallylisocyanurate (TMAIC), trimethylolpropane triacrylate (TMPTA), trimethylolpropane trimethacrylate (TMPTMA), ethylene glycol dimethacrylate (EGDA), ethylene glycol diacrylate (EGDMA), zinc diacrylate (ZDA), or zinc dimethacrylate (ZDMA). Combinations of the coagent can be used. The amount of the coagent can be 0 to about 20 parts, or about 1 to about 10 parts, or about 2 to about 5 parts, by weight, per 100 parts by weight of the base elastomer. Additionally, bisphenol AF cure system may also be chosen as the curative for some of vinylidene fluoride (VDF) containing the fluororubbers, for example, the type 1 to 4 FKM rubbers. A description of the FKM rubber types can be found in ASTM D1418.

Accelerators are optionally used to accelerate the crosslinking. Suitable accelerators are known to a person skilled in the art and include, for example, aldehyde amines; guanidines; thiazoles; sulfenamides; dithiocarbamates; thiuram sulfides; xanthates; tetraphenyltin; ammonium salt; or phosphonium salt. An amount of the accelerator may range from about 0.1 to about 10 parts by weight or about 1 to about 4 parts by weight per 100 parts by weight of the base elastomer.

Activators may increase the efficiency of the accelerators used in the process of crosslinking the rubber. In the presence of an accelerator-activator pair, an increase of curing rate, reduction of curing temperature and an increase of the mechanical properties of the produced crosslinked rubber may be observed. Activators may include, but are not limited to, metal oxides; metal hydroxides; fatty acids; metal salts; or a combination comprising at least one of the foregoing. An amount of the activator may range from about 0.1 to about 15 parts by weight or about 0.5 to about 9 parts by weight per 100 parts by weight of the base elastomer.

The energetic filler can comprise a metal and a metal oxide. Use of the energetic filler as disclosed herein is advantageous as the energetic filler is stable at wellbore temperatures but can undergo a self-sustained and self-propagated reaction that is not affected by downhole fluid or hydrostatic pressure. In addition, the energetic filler can react without the need for environmental oxygen supply. The self-sustained and self-propagated reaction generates heat, which facilitates the disintegration of the rubber matrix. In addition, the energetic filler can also improve the physical properties of the rubber matrix. The metal can have a particle size of about 10 to about 500 μm, and the metal oxide can have a particle size of about 0.1 to about 100 μm.

Choices for the metal include aluminum, magnesium, calcium, titanium, zinc, silicon, boron, and combinations including at least one of the foregoing, for example, while choices for the metal oxide include boron oxide, silicon oxide, chromium oxide, manganese oxide, iron oxide, copper oxide, lead oxide, and combinations including at least one of the foregoing, for example.

The amount and the composition of the energetic filler are selected that the energetic filler does not result in an explosion, rather the heat generated by the energetic filler is used to facilitate the disintegration of the rubber matrix. A weight ratio of the rubber matrix to the energetic filler can be about 1:6 to about 1:1, preferably about 1:5 to about 1:2, more preferably about 1:4 to about 1:2.

The rubber composite can optionally comprise a filler that is different from the energetic filler. Examples of the additional filler includes at least one of carbon black, carbon nanotubes, graphene, graphene oxide, reduced graphene oxide, mica, clay, or a ceramic material. Ceramic materials include SiC, $Si_3N_4$, $SiO_2$, BN, and the like. The additional filler can be present in an amount of about 0.5 to about 10 wt. %, or about 1 to about 8% based on the total weight of the rubber composite.

Figure 1B:
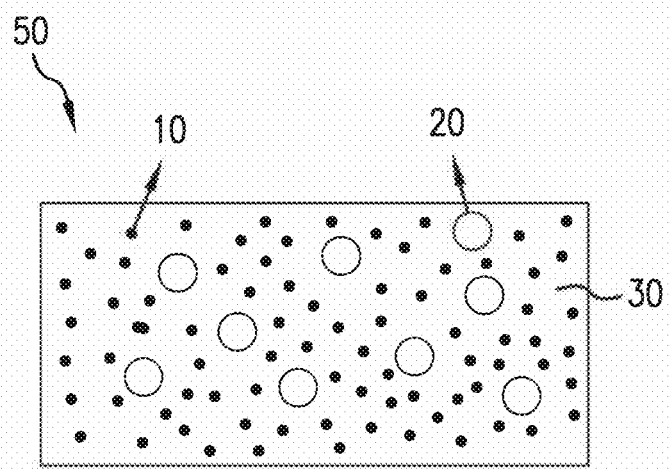
FIG. 1B is a schematic diagram of the rubber composite of FIG. 1A.

The microstructures of the rubber composite are illustrated in FIGS. 1A and 1B. As shown in FIGS. 1A and 1B, the rubber composite (50) includes a rubber matrix (30), and an energetic filler randomly disposed in the rubber matrix (30), where the energetic filler includes a metal oxide (10) and a metal (20).

The rubber composite can have a tensile elongation over 100%, for example about 150% to 500%, or about 200% to about 450%, or about 250% to about 400%, determined in accordance with ASTM D412.

Figure 2:
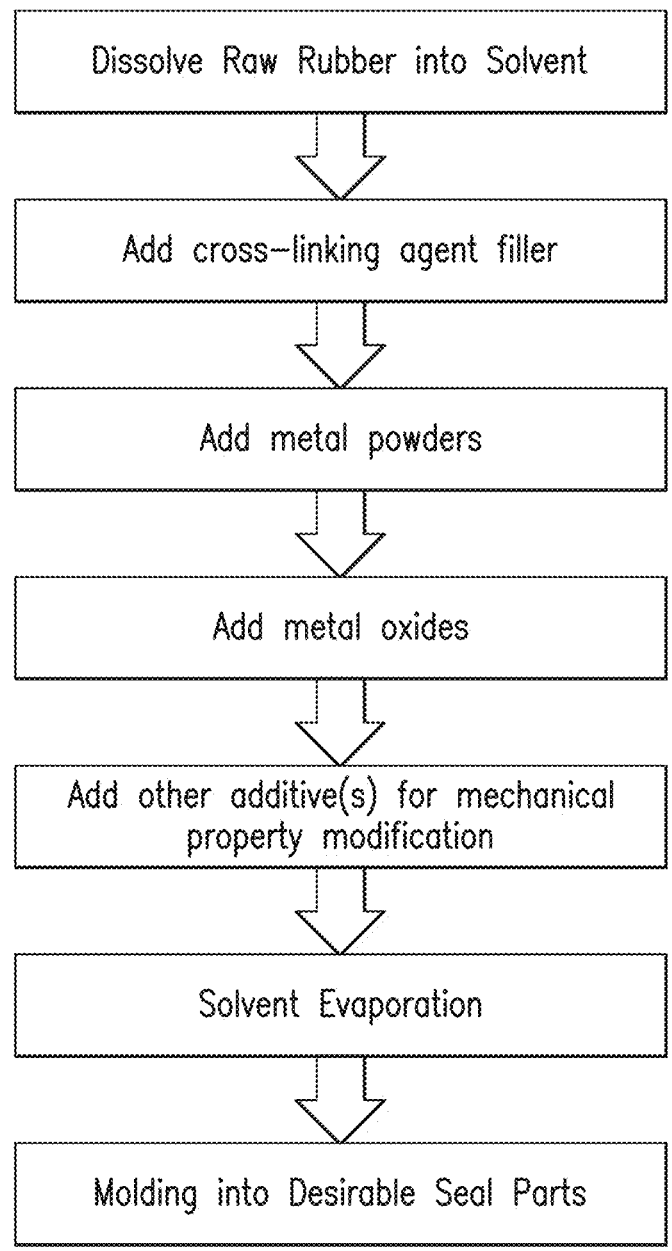
FIG. 2 is a flow chart illustrating a process of manufacturing a disintegrable rubber seal.

The disintegrable seal can be manufactured from a base elastomer, a crosslinking agent, an energetic filler, and other optional ingredients. The ingredients can be mixed by means of solution mixing or mechanical mixing. In an aspect, as shown in FIG. 2, a base elastomer is dissolved in a solvent, then the crosslinking agent, the metal, and the metal oxide along with the optional ingredients are added. The solvents can include acetone, toluene, hexane, cyclohexane, heptane, ethyl acetate, tetrahydrofuran, chloroform, dimethylformamide. Mechanical or magnetic stirring, or ultrasonication may be used to assist the solution mixing. The solvent is then evaporated, and the resultant rubber composition is molded and the base elastomer is crosslinked during molding to form the disintegrable rubber seal in its designated form.

In another aspect, the base elastomer, the crosslinking agent, the energetic filler, and other optional ingredients may be mixed by mechanical mixing using apparatus such as two-roll mill, Banbury mixer, extruder, etc. A complete mixing can be achieved through a combined shear and compression force on the material being mixed. For example, during the mill mixing, the two rolls rotate towards each other, one may be faster than the other. The speed ratio and the gap of the two rolls may be adjusted to achieve a uniform mixing. After mixing, the rubber composition is removed from the mill in a sheet form and then molded into its designated form.

The rubber seal can be used in a sealing system, which includes a mandrel, and a disintegrable rubber seal disposed about the mandrel. The disintegrable rubber seal or a sealing system comprising the same can perform various downhole operations while the disintegration of the disintegrable rubber seal is minimized. The downhole operation is not particularly limited and can be any operation that is performed during drilling, stimulation, completion, production, or remediation.

The sealing system or the rubber seal can be used to seal a wellbore. In use, the sealing system is disposed in a wellbore, and the disintegrable rubber seal is allowed to swell upon contact with a fluid, which can comprise at least one of a hydrocarbon, water, brine, an acid, or a base. In an embodiment, the fluid is a drilling fluid or a completion fluid.

Once the disintegrable rubber seal is no longer needed, the energetic filler can be activated. Thus a method of controllably removing the disintegrable seal can comprise receiving an instruction or signal to activate the energetic filler, where the instruction or signal can be provided from above the ground or from a signal source in the well, for example, from a signal source in the well close to the disintegrable rubber seal.

The instruction or signal can include at least one of electric current, electromagnetic radiation such as microwaves, laser beam, mud pulse, hydraulic pressure, or mechanical fore. Activating the energetic filler can further comprise initiating a reaction of the energetic filler to generate heat.

The disintegrable rubber seal can also include a sensor, which is operative to receive and process a signal to activate the energetic filler. More than one sensor can be included, where each sensor can have the same or different functions. The sensor can be placed at a random or a pre-determined location in the disintegrable articles.

To receive and process a signal to activate an energetic filler, the sensor can include a receiver to receive a disintegration instruction or signal, and a triggering component that is effective to generate an electric current. Illustrative triggering component includes batteries or other electronic components. Once a disintegration instruction or signal is received, the triggering component generates an electric current and triggers the activation of the energetic filler.

When the rubber matrix is exposed to the heat generated by the self-propagation reaction of the energetic filler, the rubber matrix can physically disintegrate into smaller pieces, thus the rubber seal is removed to recover an original size of a fluid pathway.

Figures 3A, 3B, 3C:
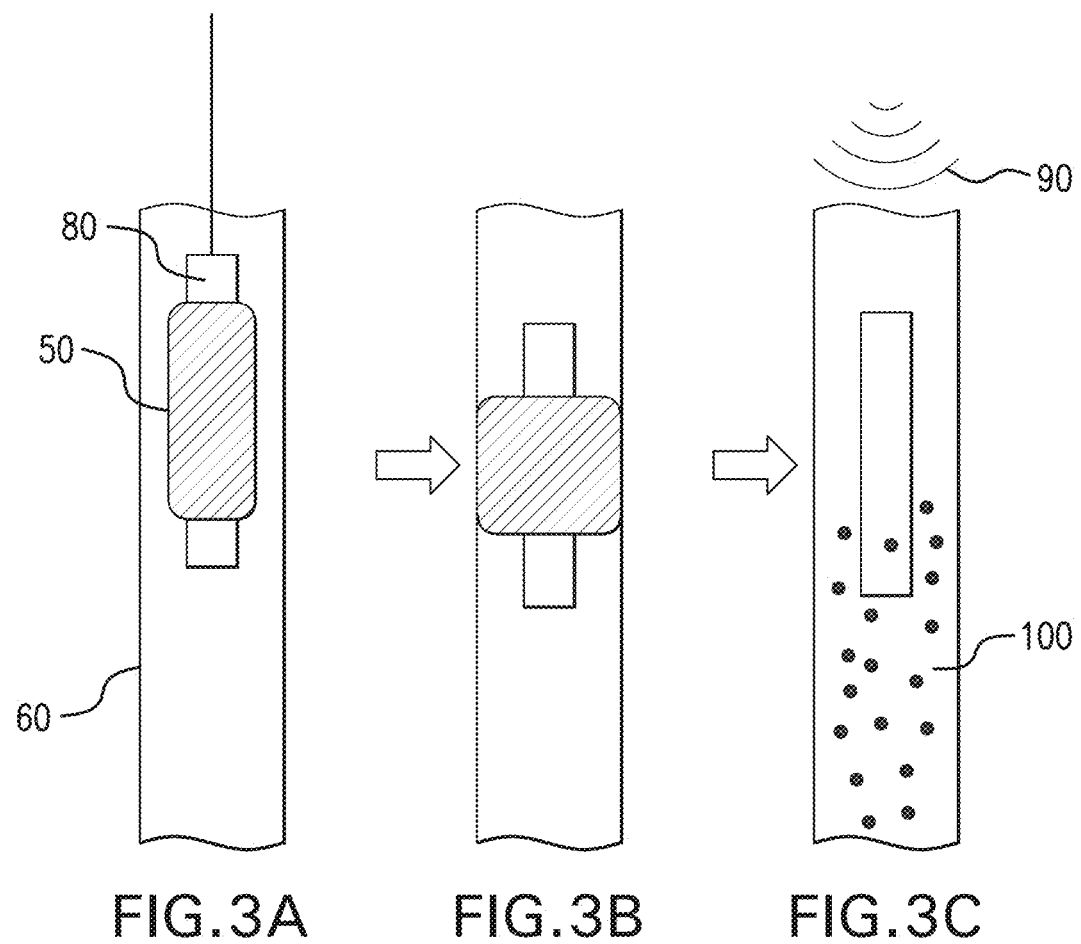
FIG. 3A-FIG. 3C illustrate a process of removing a disintegrable rubber seal, where

Referring to FIGS. 3A-3C, as a specific example, a method includes disposing a sealing system in a downhole environment, the sealing system comprising a mandrel (80) and the disintegrable rubber seal (50) disposed about the mandrel (80); allowing the disintegrable rubber seal (50) to swell upon contact with a downhole fluid forming a seal with a casing wall (60) for example; performing a downhole operation; activating the energetic filler by initiating a self-propagation reaction of the energetic filler to generate heat with a command signal (90); and disintegrating the disintegrable rubber seal with the heat generated by the self-propagation reaction into small pieces (100).

The disintegrable rubber seal and method of use are further illustrated in the example.

EXAMPLES

Example 1

A disintegrable rubber was made of NBR rubber and an energetic filler, with a rubber to filler weigh ratio of 1:2. A solution method was used to mix the ingredients with the aid of mechanical stirring. The solvent was then evaporated at a temperature below about 100° C. The mixture was then molded and cured at a temperature between 100 to 220° C. The disintegrable rubber showed a tensile elongation over 350% determined in accordance with ASTM D412.

Example 2

A disintegrable rubber was made of FKM rubber and an energetic filler, with a rubber to filler weigh ratio of 1:2. The energetic filler was added to the rubber through a two-roll mill by repeated milling. At each individual pass, the energetic filler was gradually added on to the rubber sheet until the target weight ratio was reached. The rubber sheet was folded, and the milling process was repeated until the energetic filler was uniformly mixed in the rubber matrix. Then the rubber composite sheet was removed from the roll and subject to compression molding. After molding, the rubber composite was post-cured at a temperature of 150 to 270° C. for 2 to 24 hours to further improve the physical properties of the composite. The disintegrable rubber showed a tensile elongation over 250% determined in accordance with ASTM D412.

Example 3

A disintegrable rubber was made of HNBR, an energetic filler and a carbon nanotube filler. The rubber to energetic filler weight ratio was 1:2, and the carbon nanotube was used in an amount of 2 parts by weight per one hundred parts by weight of the rubber. The carbon nanotube and energetic filler and the rubber were blended by a combination of solution mixing and mechanical mixing. The disintegrable rubber showed a tensile elongation over 250% determined in accordance with ASTM D412.

Example 4

A FKM disintegrable rubber coupon with a watertight trigger sealed and embedded inside the coupon was submerged in 3% KCl solution at a temperature of 150° F. for 50 days. The coupon remained stable without observable disintegration. Then the trigger was activated, and the coupon disintegrated rapidly in a closed chamber.

Set forth below are various embodiments of the disclosure.

Aspect 1. A disintegrable rubber seal comprising a rubber composite that comprises a rubber matrix comprising a crosslinked rubber; and an energetic filler configured to generate heat upon activation to disintegrate the rubber matrix, the energetic filler comprising a metal and a metal oxide; wherein a weight ratio of the energetic filler to the rubber matrix is about 6:1 to about 1:1.

Aspect 2. The disintegrable rubber seal as in any prior aspect, wherein the crosslinked rubber matrix is not degradable and has a degradation rate of less than 0.05 mg/cm$^2$/hour, determined in aqueous 3 wt. % KCl solution at 200° F.

Aspect 3. The disintegrable rubber seal as in any prior aspect, wherein the crosslinked rubber comprises a base elastomer crosslinked by a crosslinking agent; and the base elastomer comprises at least one of an ethylene-propylene-diene monomer rubber; a butadiene rubber; a styrene-butadiene rubber; a natural rubber; an acrylonitrile butadiene rubber; a styrene-butadiene-acrylonitrile resin; a nitrile butadiene rubber; a hydrogenated nitrile butadiene rubber; a carboxylated nitrile butadiene rubber; a carboxylated hydrogenated nitrile butadiene rubber; an amidated nitrile butadiene rubber; a polyisoprene rubber; an acrylate-butadiene rubber; a polychloroprene rubber; an acrylate-isoprene rubber; an ethylene-vinyl acetate rubber; a polypropylene oxide rubber; a polypropylene sulfide rubber; a fluorinated polymer rubber, a perfluorocarbon rubber, or a tetrafluoro ethylene propylene rubber.

Aspect 4. The disintegrable rubber seal as in any prior aspect, wherein the crosslinking agent comprises at least one of sulfur, bisphenol, or a peroxide.

Aspect 5. The disintegrable rubber seal as in any prior aspect, wherein the metal comprises at least one of aluminum, magnesium, calcium, titanium, zinc, silicon, or boron, and the metal oxide comprises at least one of boron oxide, silicon oxide, chromium oxide, manganese oxide, iron oxide, copper oxide, nickel oxide, silver oxide, or lead oxide.

Aspect 6. The disintegrable rubber seal as in any prior aspect, wherein the metal has a particle size of about 10 μm to about 500 μm, and the metal oxide has a particle size of about 0.1 μm to about 100 μm.

Aspect 7. The disintegrable rubber seal as in any prior aspect, wherein a weight ratio of the energetic filler to the rubber matrix is about 5:1 to about 2:1.

Aspect 8. The disintegrable rubber seal as in any prior aspect, wherein the rubber composite further comprises a reinforcing fiber, or a filler different from the energetic filler.

Aspect 9. The disintegrable rubber seal as in any prior aspect, further comprising a sensor that is operative to receive and process a signal to activate the energetic filler.

Aspect 10. A sealing system for a flow channel comprising a mandrel; and a disintegrable seal as in any prior aspect disposed about the mandrel.

Aspect 11. A method of manufacturing the disintegrable seal as in any prior aspect, the method comprising: mixing the base elastomer, the crosslinking agent, the metal, and the metal oxide to provide a precursor composition; and molding the precursor composition thereby forming the disintegrable rubber seal.

Aspect 12. A method of controllably removing a disintegrable rubber seal as in any prior aspect, the method comprising: disposing a sealing system in a downhole environment, the sealing system comprising a mandrel and the disintegrable rubber seal of claim 1 disposed about the mandrel; performing a downhole operation; activating the energetic filler by initiating a self-propagation reaction of the energetic filler to generate heat; and disintegrating the disintegrable seal with the heat generated by the self-propagation reaction.

Aspect 13. The method as in any prior aspect further comprising allowing the disintegrable rubber seal to swell upon contact with a downhole fluid.

Aspect 14. The method as in any prior aspect, wherein activating the energetic filler comprises providing a command signal to the disintegrable seal member, the command signal comprising at least one of electric current, electromagnetic radiation, or laser beam.

Aspect 15. The method as in any prior aspect, wherein the crosslinked rubber matrix is not degradable and has a corrosion rate of less than 0.05 mg/cm$^2$/hour, determined in aqueous 3 wt.% KCl solution at 200° F.

Aspect 16. The method as in any prior aspect, wherein the crosslinked rubber comprises a base elastomer crosslinked by a crosslinking agent; the base elastomer comprises at least one of an ethylene-propylene-diene monomer rubber; a butadiene rubber; a styrene-butadiene rubber; a natural rubber; an acrylonitrile butadiene rubber; a styrene-butadiene-acrylonitrile resin; a nitrile butadiene rubber; a hydrogenated nitrile butadiene rubber; a carboxylated nitrile butadiene rubber; a carboxylated hydrogenated nitrile butadiene rubber; an amidated nitrile butadiene rubber; a polyisoprene rubber; an acrylate-butadiene rubber; a polychloroprene rubber; an acrylate-isoprene rubber; an ethylene-vinyl acetate rubber; a polypropylene oxide rubber; a polypropylene sulfide rubber; a fluorinated polymer rubber, a perfluorocarbon rubber, or a tetrafluoro ethylene propylene rubber; and the crosslinking agent comprises at least one of sulfur, bisphenol, or a peroxide.

Aspect 17. The method as in any prior aspect, wherein the metal comprises at least one of aluminum, magnesium, calcium, titanium, zinc, silicon, or boron, and the metal oxide comprises at least one of boron oxide, silicon oxide, chromium oxide, manganese oxide, iron oxide, copper oxide, nickel oxide, silver oxide, or lead oxide.

Aspect 18. The method as in any prior aspect, wherein the metal has a particle size of about 10 μm to about 500 μm, and the metal oxide has a particle size of about 0.1 μm to about 100 μm.

Aspect 19. The method as in any prior aspect, wherein the rubber composite further comprises a reinforcing fiber, or a filler different from the energetic filler.

Aspect 20. The method as in any prior aspect, wherein the disintegrable seal further comprises a sensor that is operative to receive and process a signal to activate the energetic filler.

As used herein, the term "metal" refers to metallic or metalloid elements as defined in the Periodic Table of Elements Groups 1 to 17, including the lanthanide elements and the actinide elements.

The use of the terms "a" and "an" and "the" and similar referents in the context of describing the invention (especially in the context of the following claims) are to be construed to cover both the singular and the plural, unless otherwise indicated herein or clearly contradicted by context. The modifier "about" used in connection with a quantity is inclusive of the stated value and has the meaning dictated by the context (e.g., it includes the degree of error associated with measurement of the particular quantity). As used herein, the size or average size of the particles refers to the largest dimension of the particles and can be determined by high resolution electron or atomic force microscope technology. The ASTM standards refer to the most current version that is available at the time of filing the instant application.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A disintegrable rubber seal comprising a rubber composite that comprises a rubber matrix comprising a crosslinked rubber, wherein the crosslinked rubber is not degradable and has a degradation rate of less than 0.05 mg/cm$^2$/hour, determined in aqueous 3 wt.% KCl solution at 200° F.; and
an energetic filler configured to generate heat upon activation to disintegrate the rubber matrix, the energetic filler comprising a metal and a metal oxide;
wherein a weight ratio of the energetic filler to the rubber matrix is about 6:1 to about 1:1.

2. The disintegrable rubber seal of claim 1, wherein the crosslinked rubber comprises a base elastomer crosslinked by a crosslinking agent; and
the base elastomer comprises at least one of an ethylene-propylene-diene monomer rubber; a butadiene rubber;

a styrene-butadiene rubber; a natural rubber; an acrylonitrile butadiene rubber; a styrene-butadiene-acrylonitrile resin; a nitrile butadiene rubber; a hydrogenated nitrile butadiene rubber; a carboxylated nitrile butadiene rubber; a carboxylated hydrogenated nitrile butadiene rubber; an amidated nitrile butadiene rubber; a polyisoprene rubber; an acrylate-butadiene rubber; a polychloroprene rubber; an acrylate-isoprene rubber; an ethylene-vinyl acetate rubber; a polypropylene oxide rubber;

a polypropylene sulfide rubber; a fluorinated polymer rubber, a perfluorocarbon rubber, or a tetrafluoro ethylene propylene rubber.

3. The disintegrable rubber seal of claim 2, wherein the crosslinking agent comprises at least one of sulfur, bisphenol, or a peroxide.

4. The disintegrable rubber seal of claim 1, wherein
the metal comprises at least one of aluminum, magnesium, calcium, titanium, zinc, silicon, or boron, and
the metal oxide comprises at least one of boron oxide, silicon oxide, chromium oxide, manganese oxide, iron oxide, copper oxide, nickel oxide, silver oxide, or lead oxide.

5. The disintegrable rubber seal of claim 4, wherein the metal has a particle size of about 10 μm to about 500 μm, and the metal oxide has a particle size of about 0.1 μm to about 100 μm.

6. The disintegrable rubber seal of claim 1, wherein a weight ratio of the energetic filler to the rubber matrix is about 5:1 to about 2:1.

7. The disintegrable rubber seal of claim 1, wherein the rubber composite further comprises a reinforcing fiber, or a filler different from the energetic filler.

8. The disintegrable rubber seal of claim 1, further comprising a sensor that is operative to receive and process a signal to activate the energetic filler.

9. A sealing system for a flow channel comprising
a mandrel; and
a disintegrable seal of claim 1 disposed about the mandrel.

10. A method of manufacturing the disintegrable seal of claim 2, the method comprising:
mixing the base elastomer, the crosslinking agent, the metal, and the metal oxide to provide a precursor composition; and molding the precursor composition thereby forming the disintegrable rubber seal.

11. A method of controllably removing a disintegrable rubber seal of claim 1, the method comprising:
disposing a sealing system in a downhole environment, the sealing system comprising a mandrel and the disintegrable rubber seal of claim 1 disposed about the mandrel;
performing a downhole operation;
activating the energetic filler by initiating a self-propagation reaction of the energetic filler to generate heat; and
disintegrating the disintegrable seal with the heat generated by the self-propagation reaction.

12. The method of claim 11 further comprising allowing the disintegrable rubber seal to swell upon contact with a downhole fluid.

13. The method of claim 11, wherein activating the energetic filler comprises providing a command signal to the disintegrable seal member, the command signal comprising at least one of electric current, electromagnetic radiation, or laser beam.

14. The method of claim 11, wherein
the crosslinked rubber comprises a base elastomer crosslinked by a crosslinking agent;
the base elastomer comprises at least one of an ethylene-propylene-diene monomer rubber; a butadiene rubber; a styrene-butadiene rubber; a natural rubber; an acrylonitrile butadiene rubber; a styrene-butadiene-acrylonitrile resin; a nitrile butadiene rubber; a hydrogenated nitrile butadiene rubber; a carboxylated nitrile butadiene rubber; a carboxylated hydrogenated nitrile butadiene rubber; an amidated nitrile butadiene rubber; a polyisoprene rubber; an acrylate-butadiene rubber; a polychloroprene rubber; an acrylate-isoprene rubber; an ethylene-vinyl acetate rubber; a polypropylene oxide rubber; a polypropylene sulfide rubber; a fluorinated polymer rubber, a perfluorocarbon rubber, or a tetrafluoro ethylene propylene rubber; and
the crosslinking agent comprises at least one of sulfur, bisphenol, or a peroxide.

15. The method of claim 11, wherein
the metal comprises at least one of aluminum, magnesium, calcium, titanium, zinc, silicon, or boron, and
the metal oxide comprises at least one of boron oxide, silicon oxide, chromium oxide, manganese oxide, iron oxide, copper oxide, nickel oxide, silver oxide, or lead oxide.

16. The method of claim 11, wherein the metal has a particle size of about 10 μm to about 500 μm, and the metal oxide has a particle size of about 0.1 μm to about 100 μm.

17. The method of claim 11, wherein the rubber composite further comprises a reinforcing fiber, or a filler different from the energetic filler.

18. The method of claim 11, wherein the disintegrable seal further comprises a sensor that is operative to receive and process a signal to activate the energetic filler.

* * * * *